US010261198B2

(12) United States Patent
Shirakawa et al.

(10) Patent No.: US 10,261,198 B2
(45) Date of Patent: Apr. 16, 2019

(54) RADIATION IMAGE CONVERSION PANEL, METHOD FOR PRODUCING RADIATION IMAGE CONVERSION PANEL, RADIATION IMAGE SENSOR, AND METHOD FOR PRODUCING RADIATION IMAGE SENSOR

(71) Applicant: HAMAMATSU PHOTONICS K.K., Hamamatsu-shi, Shizuoka (JP)

(72) Inventors: Kazuhiro Shirakawa, Hamamatsu (JP); Akinori Tou, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/772,201

(22) PCT Filed: Sep. 1, 2016

(86) PCT No.: PCT/JP2016/075704
§ 371 (c)(1),
(2) Date: Apr. 30, 2018

(87) PCT Pub. No.: WO2017/077763
PCT Pub. Date: May 11, 2017

(65) Prior Publication Data
US 2018/0313963 A1 Nov. 1, 2018

(30) Foreign Application Priority Data
Nov. 5, 2015 (JP) .................. 2015-217793

(51) Int. Cl.
*G01T 1/20* (2006.01)
*G21K 4/00* (2006.01)
(Continued)

(52) U.S. Cl.
CPC .............. *G01T 1/2023* (2013.01); *G01T 1/20* (2013.01); *G03B 42/02* (2013.01); *G21K 4/00* (2013.01); *G21K 2004/12* (2013.01)

(58) Field of Classification Search
CPC ......... G01T 1/20; G01T 1/2023; G03B 42/02; G21K 2004/12; G21K 4/00
See application file for complete search history.

(56) References Cited

U.S. PATENT DOCUMENTS 7,465,932 B1 12/2008 Suzuki et al.
7,468,514 B1 12/2008 Suzuki et al.
(Continued)

FOREIGN PATENT DOCUMENTS

JP S62-174700 A 7/1987
JP 2000-241595 A 9/2000
(Continued)

OTHER PUBLICATIONS

International Preliminary Report on Patentability dated May 17, 2018 for PCT/JP2016/075704.

*Primary Examiner* — Mark R Gaworecki
(74) *Attorney, Agent, or Firm* — Drinker Biddle & Reath LLP

(57) ABSTRACT

A radiation image conversion panel includes: a substrate; a metal oxide layer formed on the substrate, including conductivity, and including a rough surface; a first organic resin layer formed on the surface of the metal oxide layer; and a fluorescent layer formed on the first organic resin layer, including a plurality of columnar crystals, and configured to emit light in accordance with incident radiation.

13 Claims, 7 Drawing Sheets

(51) Int. Cl.
G03B 42/02 (2006.01)
G01T 1/202 (2006.01)

(56) References Cited

U.S. PATENT DOCUMENTS 7,732,788 B2 6/2010 Ohbayashi
2014/0353509 A1* 12/2014 Nakatsugawa ....... G01T 1/2018
250/361 R

FOREIGN PATENT DOCUMENTS

| JP | 2007-139604 A | 6/2007 |
| JP | 2008-139604 A | 6/2008 |
| JP | 2013-217904 A | 10/2013 |
| JP | 2014-21005 A | 2/2014 |
| WO | WO-2011/089946 A1 | 7/2011 |

* cited by examiner

RADIATION IMAGE CONVERSION PANEL, METHOD FOR PRODUCING RADIATION IMAGE CONVERSION PANEL, RADIATION IMAGE SENSOR, AND METHOD FOR PRODUCING RADIATION IMAGE SENSOR

TECHNICAL FIELD

The present disclosure relates to a radiation image conversion panel, a method for producing a radiation image conversion panel, a radiation image sensor, and a method for producing a radiation image sensor.

BACKGROUND ART

Patent Literature 1 discloses a radiation image conversion panel that converts radiation into light. In such a radiation image conversion panel, metal oxides are formed as a coating layer on a surface of a member constituting the radiation image conversion panel in order to prevent foreign materials such as dust from being attached to the surface of the member due to charging.

CITATION LIST

Patent Literature

Patent Literature 1: Japanese Unexamined Patent Publication No. 2007-139604

SUMMARY OF INVENTION

Technical Problem

However, when the surface of the metal oxide coating layer is used as a bonding surface to bond another member thereto, the metal oxide coating layer which is formed to prevent foreign materials such as dust from being attached to the surface of the member has low adhesion to the other member which is bonded thereto and thus there is concern that the other member will be detached therefrom.

Therefore, an object of an aspect of the present disclosure is to provide a radiation image conversion panel, a method for producing a radiation image conversion panel, a radiation image sensor, and a method for producing a radiation image sensor in which adhesion between a metal oxide layer and another member formed on the surface thereof is improved in the radiation image conversion panel including the metal oxide layer having conductivity.

Solution to Problem

A radiation image conversion panel according to an aspect of the present disclosure includes: a substrate; a metal oxide layer formed on the substrate, including conductivity, and including a rough surface; a first organic resin layer formed on the surface of the metal oxide layer, and a fluorescent layer formed on the first organic resin layer, including a plurality of columnar crystals, and configured to emit light in accordance with incident radiation.

In the radiation image conversion panel, since the surface of the metal oxide layer is a rough surface, it is possible to cause an anchor effect between the metal oxide layer and the first organic resin layer formed on the surface thereof and thus to enhance adhesion strength between the metal oxide layer and the first organic resin layer.

The radiation image conversion panel may further include a metal reflection layer formed between the substrate and the metal oxide layer, and the metal oxide layer may be transparent to the light emitted from the fluorescent layer. Light emitted from the fluorescent layer is output from a light output surface which is a top surface of the fluorescent layer. However, a part of the light emitted from the fluorescent layer is output in a reverse direction (toward the substrate). The light output from the fluorescent layer toward the substrate is reflected toward the light output surface by the metal reflection layer formed between the substrate and the metal oxide layer. Accordingly, the radiation image conversion panel can increase a light intensity of light to be output.

The radiation image conversion panel may further include a dielectric layer formed between the metal reflection layer and the metal oxide layer. Light output from the fluorescent layer to the substrate is reflected toward the light output surface which is the top surface of the fluorescent layer by the dielectric layer. Accordingly, the radiation image conversion panel can further increase a light intensity of light to be output.

The radiation image conversion panel may further include a second organic resin layer covering the substrate, the metal reflection layer, the dielectric layer, the metal oxide layer, the first organic resin layer, and the fluorescent layer. Accordingly, the radiation image conversion panel can be protected from the outside.

In the radiation image conversion panel, a material of the substrate may be glass or a resin. For example, when a light detecting unit is bonded to the surface of the radiation image conversion panel on the fluorescent layer side and the material of the light detecting unit is glass or a resin, a difference in thermal expansion coefficient between the radiation image conversion panel and the light detecting unit bonded to the radiation image conversion panel decreases. Accordingly, it is possible to prevent the light detecting unit from being detached from the radiation image conversion panel due to the difference in thermal expansion coefficient.

In the radiation image conversion panel, the metal oxide layer may be formed of ITO, FTO, $SnO_2$, ATO, AZO, GZO, IZO, or IGZO.

In the radiation image conversion panel, the metal oxide layer may be formed of ITO and the surface thereof may have a crystal-grain area structure including crystal grains and crystallites, a polycrystalline structure including crystal grains, or a porous structure. Accordingly, in the radiation image conversion panel, it is possible to cause an anchor effect between the metal oxide layer and the first organic resin layer formed on the surface thereof and thus to enhance an adhesion strength between the metal oxide layer and the first organic resin layer.

A radiation image sensor according to an aspect of the present disclosure includes: the above-mentioned radiation image conversion panel; and a light detecting unit disposed to face the fluorescent layer and configured to detect the light emitted from the fluorescent layer. Accordingly, the radiation image sensor can detect light output from the radiation image conversion panel in response to incidence of radiation using the light detecting unit.

A method for producing a radiation image conversion panel according to an aspect of the present disclosure includes: a metal oxide layer forming step of forming a metal oxide layer on a substrate using a sputtering method, an evaporation method, or a dip-coating method; a first organic resin layer forming step of forming a first organic resin layer on a surface of the metal oxide layer using a vapor deposition method; and a fluorescent layer forming step of forming a fluorescent layer on the first organic resin layer using a vapor deposition method.

In the producing method, the surface of the metal oxide layer can be made to be rough by forming the layer using a sputtering method, an evaporation method, or a dip-coating method. Accordingly, the producing method can cause an anchor effect between the metal oxide layer and the first organic resin layer formed on the surface thereof and thus enhance adhesion strength between the metal oxide layer and the first organic resin layer.

The method for producing a radiation image conversion panel may further include a metal reflection layer forming step of forming a metal reflection layer on the substrate using a vapor deposition method before the metal oxide layer forming step, and the metal oxide layer forming step may be a step of forming the metal oxide layer on the metal reflection layer on the substrate. Accordingly, light output from the fluorescent layer to the substrate is reflected toward the light output surface which is the top surface of the fluorescent layer. Accordingly, the producing method can increase a light intensity of light which is output from the radiation image conversion panel.

The method for producing a radiation image conversion panel may further include a dielectric layer forming step of forming a dielectric layer on the metal reflection layer using a vapor deposition method after the metal reflection layer forming step, and the metal oxide layer forming step may be a step of forming the metal oxide layer on the dielectric layer on the substrate. Light output from the fluorescent layer to the substrate is reflected toward the light output surface which is the top surface of the fluorescent layer by the dielectric layer. Accordingly, the producing method can further increase a light intensity of light which is output from the radiation image conversion panel.

The method for producing a radiation image conversion panel may further include a second organic resin layer forming step of forming a second organic resin layer to cover the substrate, the metal reflection layer, the dielectric layer, the metal oxide layer, the first organic resin layer, and the fluorescent layer using a vapor deposition method. Accordingly, the producing method can protect the radiation image conversion panel from the outside.

A method for producing a radiation image sensor includes: a light detecting unit disposing step of disposing a light detecting unit, which detects the light emitted from the fluorescent layer of the radiation image conversion panel, on the fluorescent layer side of the above-mentioned radiation image conversion panel. Accordingly, with the producing method, it is possible to detect light output from the radiation image conversion panel in response to incidence of radiation using the light detecting unit.

Advantageous Effects of Invention

According to the aspects of the present disclosure, it is possible to provide a radiation image conversion panel, a method for producing a radiation image conversion panel, a radiation image sensor, and a method for producing a radiation image sensor in which adhesion between a metal oxide layer and another member formed on the surface thereof is improved in the radiation image conversion panel including the metal oxide layer having conductivity.

DESCRIPTION OF EMBODIMENTS

Figure 1:
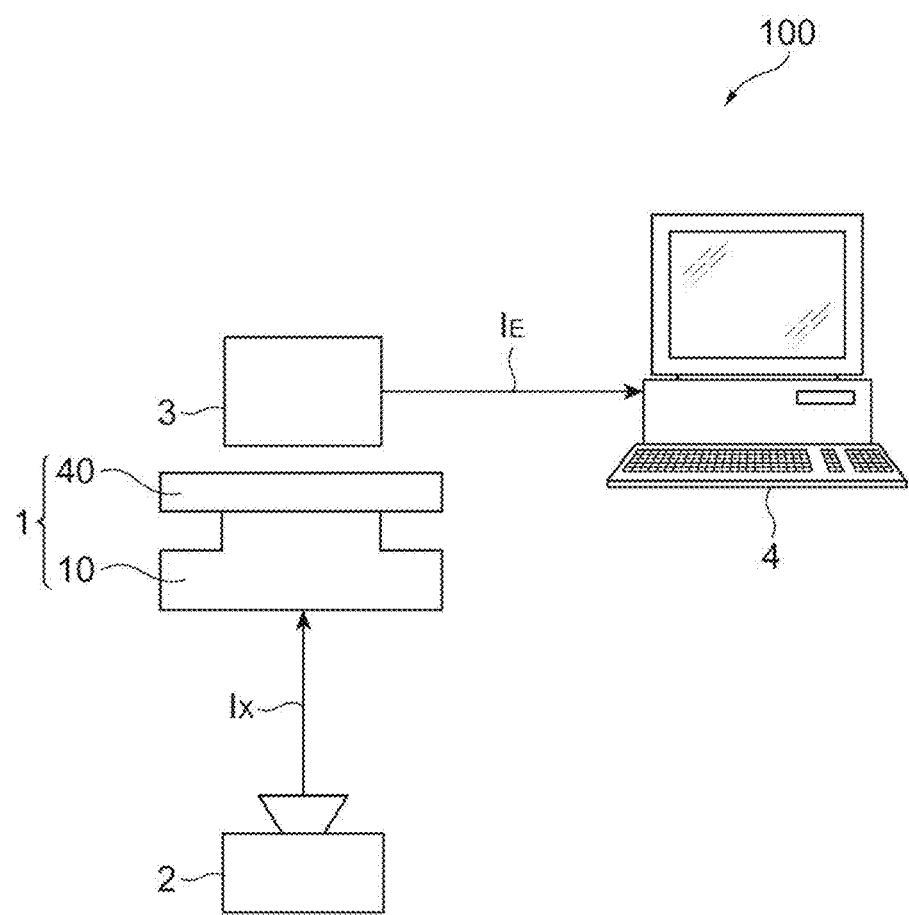
FIG. 1 is a diagram illustrating an entire configuration of a radiation image system including a radiation image conversion panel according to a first embodiment.

Hereinafter, embodiments will be described in detail with reference to the accompanying drawings. In the drawings, the same or corresponding elements will be referenced by the same reference signs and description thereof will not be repeated.

First Embodiment

FIG. 1 is a diagram illustrating an entire configuration of a radiation image system 100 including a radiation image conversion panel according to a first embodiment. The radiation image system 100 illustrated in FIG. 1 is a system that irradiates a subject with radiation and converts transmitted radiation into an image (a radiation image) and is used, for example, for image diagnosis in the medical field or industrial nondestructive inspection. As illustrated in FIG. 1, the radiation image system 100 includes a radiation image sensor 1, a radiation source 2, an electronic device 3, and an information processing device 4.

The radiation source 2 is a source of radiation $I_X$ and outputs, for example, X-rays. The radiation $I_X$ output from the radiation source 2 is input to the radiation image sensor 1. A subject (not illustrated) is disposed between the radiation image sensor 1 and the radiation source 2.

The radiation image sensor 1 includes a radiation image conversion panel 10 and a light detecting unit 40. The radiation image conversion panel 10 is a plate-shaped member and outputs light corresponding to incident radiation $I_X$. Details of the radiation image conversion panel 10 will be described later.

The light detecting unit 40 is disposed to face a fluorescent layer 17 of the radiation image conversion panel 10 which will be described later and detects light emitted from the fluorescent layer 17 (see FIG. 3). The light detecting unit 40 includes an imaging surface 40a (see FIG. 2) on which light is incident. The light detecting unit 40 outputs an electrical signal $I_E$ in accordance with light incident on the imaging surface 40a. For example, an imaging tube in addition to a TFT panel in which a photodiode (PD) and thin-film transistors (TFT) are arranged on a substrate or a solid imaging device such as a charge-coupled device (CCD) or a complementary metal oxide semiconductor (CMOS) can be used as the light detecting unit 40. Accordingly, the radiation image sensor 1 outputs an electrical signal $I_E$ corresponding to the radiation $I_X$ transmitted by a subject to the electronic device 3. When a solid imaging device such as a CCD or a CMOS is used as the light detecting unit 40, the solid imaging device may be bonded to the radiation image conversion panel via a fiber-optic plate (FOP: an optical device with optical fibers of several microns as bundles, for example, J5734 which is made by Hamamatsu Photonics K.K.).

The electronic device 3 performs a predetermined process (for example, digitalization) on the electrical signal $I_E$ output from the radiation image sensor 1 and outputs the resultant electrical signal to the information processing device 4. The electrical signal $I_E$ may be sent as an analog signal to the information processing device 4 or may be converted into a digital signal by the light detecting unit 40. The electronic device 3 may perform another process in addition to digitalization on the acquired electrical signal $I_E$. The electronic device 3 may control operation of the light detecting unit 40.

The information processing device 4 is a computer including a computing unit such as a central processing unit (CPU), a storage unit such as a read only memory (ROM), a random access memory (RAM), and a hard disk drive (HDD), a display unit such as a display device, and an operation unit such as a mouse and a keyboard. The information processing device 4 converts the electrical signal $I_E$ output from the electronic device 3 into image information and displays the image information as a radiation image on the display unit, performs image processing, or stores information corresponding to the electrical signal $I_E$ output from the electronic device 3 in the storage unit.

In the radiation image system 100, a radiation image is acquired as follows. First, radiation $I_X$ output from the radiation source 2 is transmitted by a subject and is incident on the radiation image conversion panel 10. The radiation $I_X$ is converted into light by the radiation image conversion panel 10. The light is incident on the imaging surface 40a of the light detecting unit 40. An electrical signal $I_E$ corresponding to the light is output from the light detecting unit 40. The output electrical signal $I_E$ is sent to the information processing device 4 via the electronic device 3 and is subjected to a predetermined process, and a radiation image is acquired. In the information processing device 4, the radiation image is displayed on the display unit or image information is stored in the storage unit.

Figure 2:
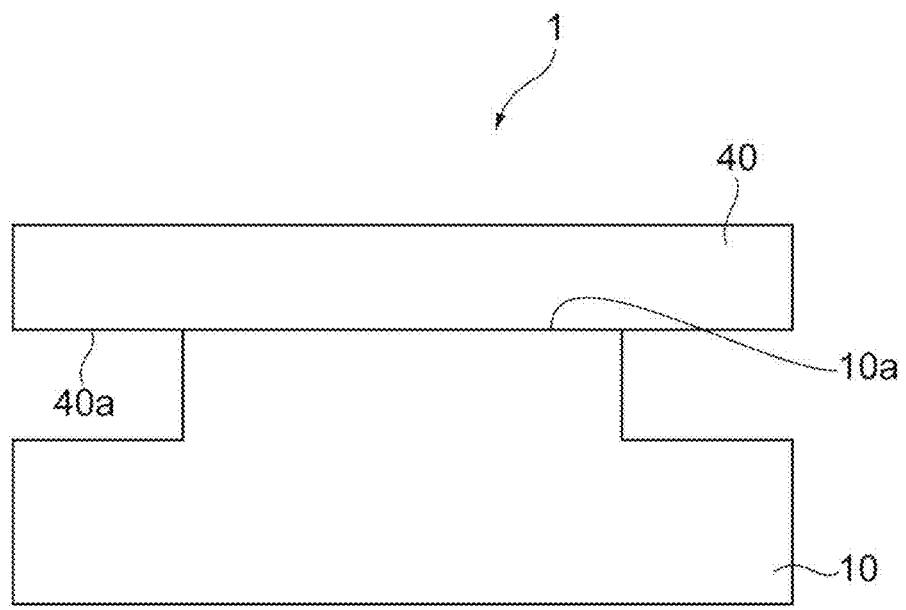
FIG. 2 is a side view of a radiation image sensor according to the first embodiment.
Figure 3:
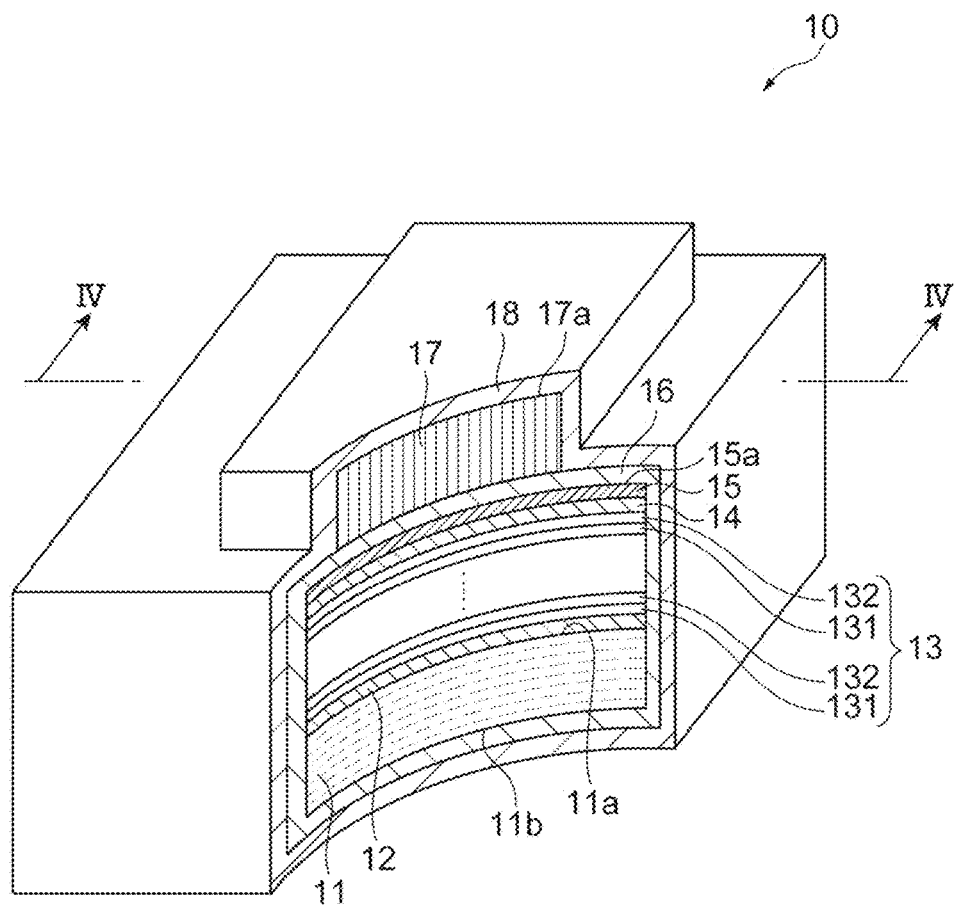
FIG. 3 is a partially exploded perspective view of the radiation image conversion panel according to the first embodiment.

FIG. 2 is a side view of the radiation image sensor 1 according to the first embodiment. As illustrated in FIG. 2, the radiation image sensor 1 includes the radiation image conversion panel 10 and the light detecting unit 40 (a TFT panel). The radiation image sensor 1 is formed by directly bonding the top surface 10a on a light output surface side of the radiation image conversion panel 10 to the imaging surface 40a of the light detecting unit 40. The radiation image conversion panel 10 and the light detecting unit 40 may be bonded to each other using an adhesive or an optical coupling material (a refractive index matching material) may be used to reduce optical loss. The radiation image conversion panel 10 and the light detecting unit 40 may not be bonded to each other. For example, both may be mechanically coupled using a fixing member. The radiation image conversion panel 10 and the light detecting unit 40 may not necessarily be in contact with each other, but may be separated from each other.

Since the radiation image conversion panel 10 and the light detecting unit 40 can be integrated as a single body, the radiation image sensor 1 can be easily handled and easily adjusted by omitting an optical system.

Figure 4:
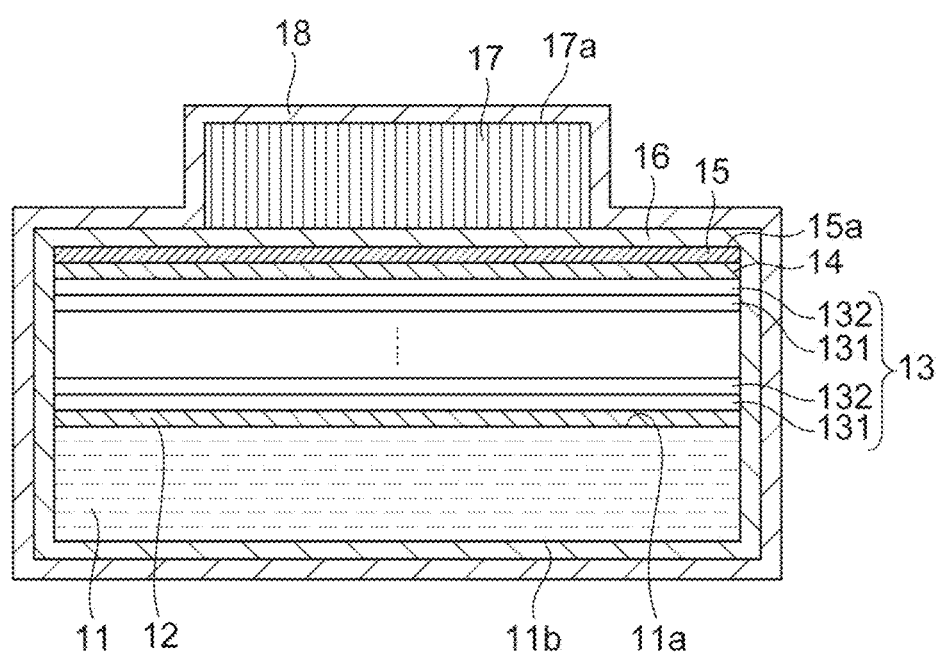
FIG. 4 is a sectional view taken along line IV-IV in FIG. 3.

Details of the radiation image conversion panel 10 will be described below. FIG. 3 is a partially exploded perspective view of the radiation image conversion panel 10 according to the first embodiment. FIG. 4 is a sectional view taken along line IV-IV in FIG. 3. As illustrated in FIGS. 3 and 4, the radiation image conversion panel 10 is configured as a stacked body including a substrate 11, a metal reflection layer 12, a dielectric layer 13, a protective layer 14, a metal oxide layer 15, a first organic resin layer 16, a fluorescent layer 17, and a second organic resin layer 18. The substrate 11 includes a front surface 11a and a rear surface 11b and serves as a support substrate of the fluorescent layer 17.

The stacked body includes the fluorescent layer 17 that includes a plurality of columnar crystals and emits light depending on radiation $I_X$ incident thereon. The fluorescent layer 17 is disposed on the substrate 11 and on the front surface 11a side of the substrate 11. "On the substrate" refers to an upper side of the substrate 11 and meaning that not only it is provided in contact with the front surface 11a of the substrate 11 but also that a layer or a space may be interposed between it and the substrate 11. In this embodiment, the metal reflection layer 12, the dielectric layer 13, the protective layer 14, the metal oxide layer 15, and the first organic resin layer 16 are interposed between the substrate 11 and the fluorescent layer 17.

The fluorescent layer 17 includes a fluorescent material that converts radiation $I_X$ into light. Examples of light include visible light, infrared light, and ultraviolet light. The top surface (the front surface 17a) of the fluorescent layer 17 is a light output surface that outputs light. In this embodiment, the fluorescent layer 17 includes columnar crystals of cesium iodide (CsI) doped with thallium (Tl) or sodium (Na). The fluorescent layer 17 may be formed using sodium iodide (NaI) doped with Tl, potassium iodide (KI) doped with Tl, or lithium iodide (LiI) doped with europium (Eu) as a material. The thickness of the fluorescent layer 17 ranges, for example, from 100 μm to 1000 μm, but is not limited thereto. For example, the thickness of the fluorescent layer 17 may range from 400 μm to 700 μm. An average needle diameter of the columnar crystals constituting the fluorescent layer 17 may range from 3 μm to 10 μm.

The fluorescent layer 17 is set to a smaller size than the substrate 11 when viewed in the thickness direction of the substrate 11. A positional relationship between the fluorescent layer 17 and the substrate 11 in a direction perpendicular to the thickness direction is appropriately set within a range in which the fluorescent layer 17 and the substrate 11 overlap each other when viewed in the thickness direction of the radiation image conversion panel 10.

In the radiation image conversion panel 10, radiation $I_X$ is incident from the rear surface 11b side of the substrate 11. That is, the rear surface 11b of the substrate 11 is a radiation incidence surface. Accordingly, the substrate 11 is formed of a material having radiolucency. In this embodiment, the material of the substrate 11 is glass. Examples of the glass include non-alkali glass, quartz glass, and chemically strengthened glass. The material of the substrate 11 is not limited thereto, and may be a resin. Examples of the resin include polyethylene terephthalate (PET) and polyimide (PI). Alternatively, amorphous carbon or aluminum (Al) may be used as the material of the substrate 11. The thickness of the substrate 11 ranges, for example, from 0.02 mm to 0.6 mm.

Figure 5:
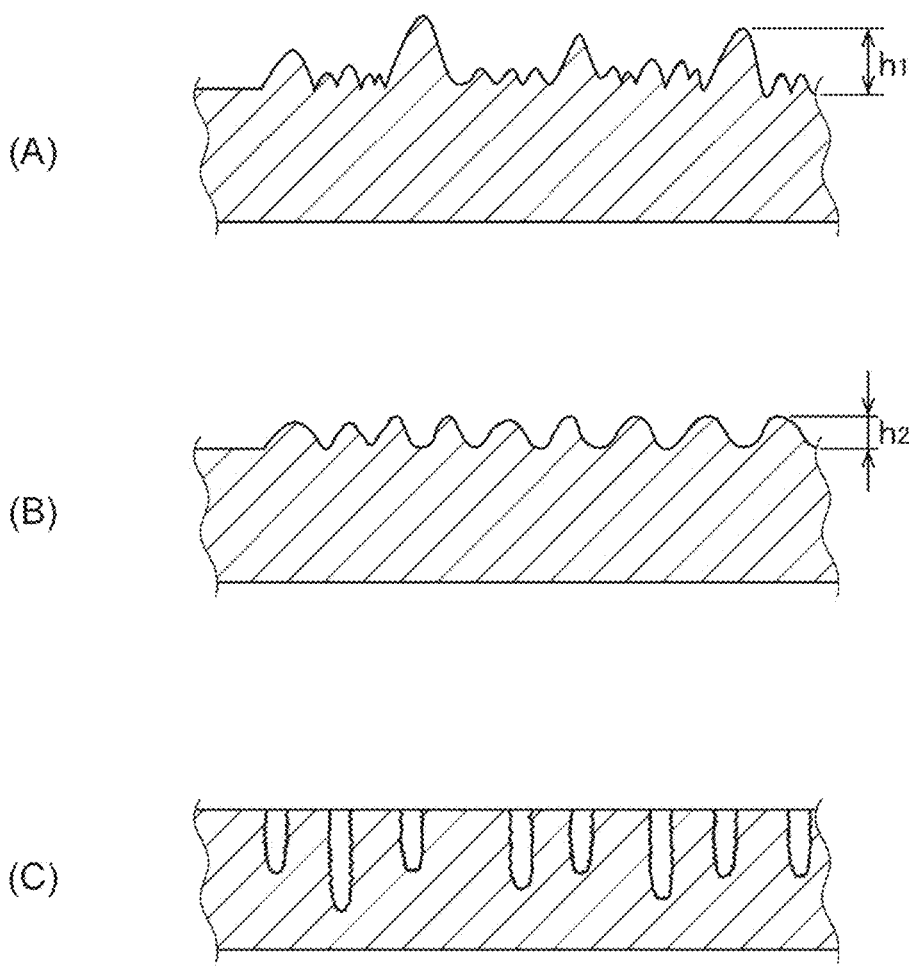
FIG. 5 is an enlarged sectional view illustrating a surface structure of a metal oxide layer.

The metal oxide layer 15 and the first organic resin layer 16 are formed between the substrate 11 and the fluorescent layer 17. The metal oxide layer 15 is formed on the substrate 11 and has conductivity. The front surface 15a of the metal oxide layer 15 is a rough surface. The rough surface refers to a surface having a crystal grain area structure (a grain-subgrain structure) including crystal grains (grains) and crystallites (sub-grains), a surface having a polycrystalline structure including crystal grains, or a surface having a porous structure. FIG. 5 is an enlarged sectional view illustrating a surface structure of the metal oxide layer 15. A crystal grain area structure is illustrated in (A) of FIG. 5. In the crystal grain area structure, the surface is covered with crystal grains and crystallites. The crystal grains may include crystallites. A particle diameter of a crystal grain ranges, for example, from about 200 nm to 350 nm and a particle diameter of a crystallite ranges, for example, from about 20 nm to 50 nm. An unevenness height $h_1$ ranges from about Ra2.6 to Ra6.0 in terms of arithmetic average roughness. A polycrystalline structure is illustrated in (B) of FIG. 5. In the polycrystalline structure, the surface is covered with crystal grains. An unevenness height $h_2$ ranges from about Ra0.9 to Ra1.5 nm in terms of arithmetic average roughness. A porous structure is illustrated in (C) of FIG. 5. In the porous structure, a plurality of pores are formed on the surface thereof.

The metal oxide layer 15 is formed of a material which is transparent to light emitted from the fluorescent layer 17. The metal oxide layer 15 is formed of, for example, indium tin oxide (ITO). The metal oxide layer 15 may be a layer which is formed of FTO (fluorine is added as a dopant to tin oxide), $SnO_2$ (tin oxide), ATO (antimony is added as a dopant to tin oxide), AZO (aluminum is added as a dopant to zinc oxide), GZO (gallium is added as a dopant to zinc oxide), IZO (indium is added as a dopant to zinc oxide), or IGZO (indium and gallium are added as a dopant to zinc oxide). The metal oxide layer 15 is a thin film with a thickness of about 10 nm to 300 nm.

The first organic resin layer 16 is a protective layer which is formed on the front surface 15a of the metal oxide layer 15. "On the surface" refers to contact with the surface. The fluorescent layer 17 is formed on the first organic resin layer 16. "On the first organic resin layer 16" refers to an upper side of the first organic resin layer 16, and meaning that not only it is provided in contact with the surface of the first organic resin layer 16 but also a layer or a space may be interposed between it and the first organic resin layer 16.

An example of the material of the first organic resin layer 16 is polyparaxylylene. The material of the first organic resin layer 16 may be a xylene-based material such as xylpoly-monochloroparaxylylene, polydichloroparaxylylene, polytetrachloroparaxylylene, polyfluoroparaxylylene, polydimethylparaxylylene, or polydiethylparaxylylene, polyuria, polyimide, acryl resin, or urethane acryl resin. In this embodiment, the thickness of the first organic resin layer 16 is about 10 μm, but is not limited thereto.

The metal reflection layer 12 is formed between the substrate 11 and the metal oxide layer 15. The metal reflection layer 12 reflects light emitted from the fluorescent layer 17. The metal reflection layer 12 reflects light emitted from the fluorescent layer 17 to the substrate 11 toward the light output surface which is the front surface 17a of the fluorescent layer 17. The metal reflection layer 12 is formed of a metal such as Au (gold), Ag (silver), or Al. The thickness of the metal reflection layer 12 may be set to range, for example, from 50 nm to 200 nm in consideration of balance between optical reflectance of the metal reflection layer 12 and radiation intensity incident on the fluorescent layer 17.

The dielectric layer 13 is formed between the metal reflection layer 12 and the metal oxide layer 15. The dielectric layer 13 is formed on the surface of the metal reflection layer 12. The dielectric layer 13 is a multilayer structure in which a first dielectric layer 131 and a second dielectric layer 132 are alternately stacked at least one by one. The first dielectric layer 131 and the second dielectric layer 132 are formed of dielectric materials having different refractive indices. The first dielectric layer is formed of, for example, $SiO_2$ (silicon dioxide), and the second dielectric layer is formed of, for example, $TiO_2$ (titanium oxide) or $Nb_2O_5$ (niobium oxide). The dielectric layer 13 reflects light emitted from the fluorescent layer 17 to the substrate 11 toward the light output surface which is the front surface 17a of the fluorescent layer 17.

The radiation image conversion panel 10 may not include at least one of the metal reflection layer 12 and the dielectric layer 13. When the radiation image conversion panel 10 does not include the metal reflection layer 12 and the dielectric layer 13, the metal oxide layer 15 may not be formed of a material which is transparent to light emitted from the fluorescent layer 17.

The protective layer 14 is formed between the dielectric layer 13 and the metal oxide layer 15. The protective layer 14 is formed on the surface of the dielectric layer 13. An example of the material of the protective layer 14 is $SiO_2$. The radiation image conversion panel 10 may not include the protective layer 14.

In this embodiment, the first organic resin layer 16 is provided to cover the front surface of the metal oxide layer 15 and to cover the entire surface of a first stacked body including the substrate 11, the metal reflection layer 12, the dielectric layer 13, the protective layer 14, and the metal oxide layer 15. When the radiation image conversion panel 10 does not include the protective layer 14, the first organic resin layer 16 may cover the entire surface of the first stacked body including the substrate 11, the metal reflection layer 12, the dielectric layer 13, and the metal oxide layer 15. The first organic resin layer 16 may not cover the entire surface of the first stacked body. That is, a partial area of the first stacked body may not be covered by the first organic resin layer 16.

In this embodiment, the second organic resin layer 18 is provided around the first stacked body covered by the first organic resin layer 16 and the fluorescent layer 17 formed on the top surface of the first stacked body. That is, the second organic resin layer 18 is provided to cover a second stacked body including the substrate 11, the metal reflection layer 12, the dielectric layer 13, the protective layer 14, the metal oxide layer 15, the first organic resin layer 16, and the fluorescent layer 17. When the radiation image conversion panel 10 does not include the protective layer 14, the second organic resin layer 18 may cover the entire surface of the second stacked body including the substrate 11, the metal reflection layer 12, the dielectric layer 13, the metal oxide layer 15, the first organic resin layer 16, and the fluorescent layer 17. The second organic resin layer 18 may not cover the entire surface of the second stacked body. That is, a partial area of the second stacked body may not be covered by the second organic resin layer 18.

The second organic resin layer 18 may be formed of the same material as the first organic resin layer 16 or may be formed of a different material. The thickness of the second organic resin layer 18 is, for example, 10 μm. The radiation image conversion panel 10 may not include the second organic resin layer 18.

Operations and advantages of the radiation image conversion panel 10 according to this embodiment will be described below.

Radiation $I_X$ incident on the rear surface side of the radiation image conversion panel 10 is sequentially transmitted by the second organic resin layer 18, the first organic resin layer 16, the substrate 11, the metal reflection layer 12, the dielectric layer 13, the protective layer 14, the metal oxide layer 15, and the first organic resin layer 16 and is then incident on the fluorescent layer 17. Light is emitted from the fluorescent layer 17 depending on the incident radiation $I_X$. Light corresponding to the radiation $I_X$ is output from the front surface 17a which is the top surface of the fluorescent layer 17.

A part of light emitted from the fluorescent layer 17 is output reversely (to the substrate 11). Since the metal oxide layer 15 is formed of a material which is transparent to light emitted from the fluorescent layer 17, the light output to the substrate 11 side passes through the metal oxide layer 15 and arrives at the dielectric layer 13 or the metal reflection layer 12. The arrived light is reflected toward the light output surface by the dielectric layer 13 or the metal reflection layer 12. Accordingly, the radiation image conversion panel 10 can increase the light intensity of light which is output.

In the radiation image conversion panel 10, glass is used as the material of the substrate 11. For example, when the light detecting unit 40 is bonded to the top surface on the light output surface side of the radiation image conversion panel 10 and a substrate material of the light detecting unit 40 is glass, a difference in thermal expansion coefficient between the radiation image conversion panel 10 and the light detecting unit 40 decreases. In this case, the radiation image conversion panel 10 can prevent the light detecting unit 40 from being detached from the radiation image conversion panel 10 due to a difference in thermal expansion coefficient. When the light detecting unit 40 is bonded to the top surface on the light output surface side of the radiation image conversion panel 10 and a substrate material of the light detecting unit 40 is resin, a difference in thermal expansion coefficient between the radiation image conversion panel 10 and the light detecting unit 40 decreases by employing resin as the material of the substrate 11. Accordingly, the radiation image conversion panel 10 can prevent the light detecting unit 40 from being detached from the radiation image conversion panel 10 due to a difference in thermal expansion coefficient. By using glass or resin as the material of the radiation image conversion panel 10 and decreasing the difference in thermal expansion coefficient from the light detecting unit 40, it is possible to prevent fine scratches on the substrate 11 or scratches generated between the light detecting unit 40 and the radiation image conversion panel due to an abnormal growing portion, which is caused when the fluorescent layer 17 is formed by vapor deposition, from moving with respect to the imaging surface 40a by heat at the time of operation. Accordingly, the radiation image conversion panel 10 can prevent calibration from being complicated.

When the substrate 11 is formed of glass, the problem due to the difference in thermal expansion coefficient as described above can be solved and the surface of the substrate 11 formed of glass is much flattened. Accordingly, the radiation image conversion panel 10 can improve flatness of the layers formed on the substrate 11. When the substrate 11 is formed of glass, static electricity is likely to be generated. Accordingly, at the time of manufacturing the radiation image conversion panel 10, foreign materials such as dust may be attached to the surface of members constituting the radiation image conversion panel 10 due to the static electricity. When the first organic resin layer 16 is formed on the surface which has been uneven due to attachment of foreign materials such as dust, the surface of the first organic resin layer 16 may have unevenness along the foreign materials such as dust attached thereto. When the fluorescent layer 17 is formed on the uneven surface of the first organic resin layer 16, columnar crystals constituting the fluorescent layer 17 grow abnormally and thus there is concern that a defective image will be generated.

Since the radiation image conversion panel 10 includes the metal oxide layer 15 having conductivity, static electricity can be removed and attachment of foreign materials such as dust to the surface thereof by charging can be prevented. Accordingly, the radiation image conversion panel 10 can prevent abnormal shadow which is caused by mixture of foreign materials into from the radiation incidence surface to the fluorescent layer 17. The radiation image conversion panel 10 can secure flatness of the fluorescent layer 17, because foreign materials are not attached to a base layer of the fluorescent layer 17. That is, the radiation image conversion panel 10 can curb abnormal growth of columnar crystals constituting the fluorescent layer 17 formed on the first organic resin layer 16 and prevent a defective image from being generated.

Since the metal oxide layer 15 is a thin film, the radiation image conversion panel 10 can minimize absorption of radiation $I_X$ by the metal oxide layer 15. Since the metal oxide layer 15 is a thin film and is formed of a material which is transparent to light emitted from the fluorescent layer 17, the radiation image conversion panel 10 can secure transmittance of light reflected by the metal reflection layer 12.

In the radiation image conversion panel 10, since the front surface 15a of the metal oxide layer 15 is a rough surface, it is possible to cause an anchor effect between the metal oxide layer 15 and the first organic resin layer 16 formed on the front surface 15a thereof and to enhance an adhesion strength between the metal oxide layer 15 and the first organic resin layer 16. Since the fluorescent layer 17 is formed on the front surface of the first organic resin layer 16, the first organic resin layer 16 which is a base layer comes into close contact with the metal oxide layer 15 and a structure in which the fluorescent layer 17 is not likely to be detached from the metal oxide layer 15 is achieved as a result. That is, the radiation image conversion panel 10 can improve shock resistance. As described above, the unevenness height $h_1$ on the surface of the crystal grain structure ranges from about Ra2.6 to Ra6.0 nm in terms of arithmetic average roughness, and the unevenness height $h_2$ on the surface of the polycrystalline structure of crystal grains ranges from about Ra0.9 to Ra1.5 nm in terms of arithmetic average roughness. That is, the size of the unevenness is much smaller than foreign materials of several μm. Accordingly, even when the front surface 15a of the metal oxide layer 15 is a rough surface, abnormal growth of columnar crystals of the fluorescent layer 17 is not caused.

When the dielectric layer 13 is formed using vapor deposition, micro pinholes may be formed. When the fluorescent layer 17 is directly formed on the surface of the dielectric layer 13, components of the fluorescent layer 17 may reach the metal reflection layer 12 via the micro pinholes which are present in the dielectric layer 13 and serve as causes of corrosion and deterioration of the metal reflection layer 12. In this embodiment, since the first organic resin layer 16 is formed, the radiation image conversion panel 10 can plug pinholes even when the pinholes are formed at the time of forming the dielectric layer 13. Accordingly, the radiation image conversion panel 10 can prevent components of the fluorescent layer 17 from reaching the metal reflection layer 12. In addition, since the entire radiation image conversion panel 10 is covered, it is possible to prevent components of the fluorescent layer 17 from reaching the metal reflection layer 12 from the side surface of the substrate 11.

The second organic resin layer 18 is formed to cover at least the substrate 11, the metal reflection layer 12, the dielectric layer 13, the metal oxide layer 15, the first organic resin layer 16, and the fluorescent layer 17. That is, even when the fluorescent layer 17 is formed of a deliquescent material, it is possible to prevent intrusion of moisture into the fluorescent layer 17 by the second organic resin layer 18. The second organic resin layer 18 can protect the radiation image conversion panel 10 from the outside.

In the radiation image conversion panel 10, since the metal reflection layer 12, the dielectric layer 13, the protective layer 14, and the metal oxide layer 15 are formed of inorganic materials, the difference in thermal expansion coefficient between the layers can be decreased. Accordingly, it is possible to provide a radiation image conversion panel 10 with excellent thermal shock resistance.

Figure 6:
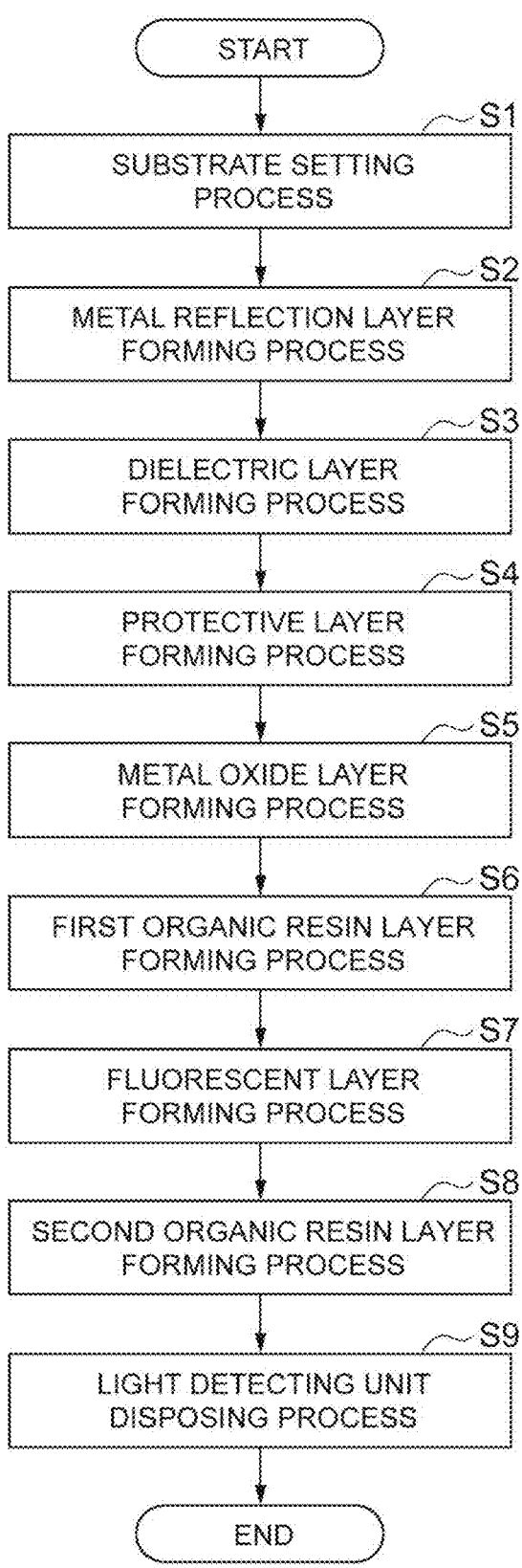
FIG. 6 is a flowchart illustrating a method for producing the radiation image conversion panel and the radiation image sensor according to the first embodiment.

A method for producing the radiation image conversion panel 10 and the radiation image sensor 1 will be described below. FIG. 6 is a flowchart illustrating the method for producing the radiation image conversion panel 10 and the radiation image sensor 1 according to the first embodiment. As illustrated in FIG. 6, the method for producing the radiation image conversion panel 10 includes a substrate setting process (S1: a substrate setting step), a metal reflection layer forming process (S2: a metal reflection layer forming step), a dielectric layer forming process (S3: a dielectric layer forming step), a protective layer forming process (S4: a protective layer forming step), a metal oxide layer forming process (S5: a metal oxide layer forming step), a first organic resin layer forming process (S6: a first organic resin layer forming step), a fluorescent layer forming process (S7: a fluorescent layer forming step), and a second organic resin layer forming process (S8: a second organic resin layer forming step). The method for producing the radiation image conversion panel 10 is performed using general-purpose film formation equipment.

First, a substrate 11 is prepared as the substrate setting process (S1). For example, a substrate 11 is arranged in a substrate holder in a chamber of the film formation equipment.

Then, as the metal reflection layer forming process (S2), a metal reflection layer 12 is formed on the surface of the substrate 11 using a vapor deposition method. The vapor deposition method includes a physical vapor deposition method and a chemical vapor deposition method. The physical vapor deposition method includes a sputtering method and an evaporation method. The sputtering method is a method for preparing a material target in a chamber, generating discharge between the substrate and the material target in the atmosphere of inert gas, causing anions generated by the discharging to collide with the material target to sputter the material and depositing the material on the substrate. The evaporation method is a method for heating and evaporating a material and depositing the material on the substrate. The chemical vapor deposition method is a film formation method for introducing a material gas into the chamber, decomposing the material gas using heat or plasma, and depositing the material on the surface of the substrate.

Subsequently, as the dielectric layer forming process (S3), a dielectric layer 13 is formed on the surface of the metal reflection layer 12 using a vapor deposition method. The dielectric layer 13 is formed by alternately stacking the first dielectric layer 131 and the second dielectric layer 132 at least one by one.

Subsequently, as the protective layer forming process (S4), a protective layer 14 is formed on the surface of the dielectric layer 13 using a vapor deposition method.

Subsequently, as the metal oxide layer forming process (S5), a metal oxide layer 15 is formed on the surface of the protective layer 14 using a sputtering method, an evaporation method, or a dip-coating method. When an ITO film is formed using a sputtering method, the surface having the crystal grain area structure illustrated in (A) of FIG. 5 is obtained. When an ITO film is formed using a vapor deposition method, the surface having the polycrystalline structure illustrated in (B) of FIG. 5 is obtained. That is, this producing method can make the surface of the metal oxide layer 15 a rough surface. The dip-coating method is a method for forming a thin film by immersing a substrate in a solvent solution of a material in a state in which the substrate stands up vertically, then pulling out the substrate, and drying and baking the substrate. When the metal oxide layer 15 is formed using a dip-coating method, the substrate 11 is taken out of the chamber and then is subjected to the process. When an ITO film is formed using a dip-coating method, the surface having the porous structure illustrated in (C) of FIG. 5 is obtained. Even when ITO, FTO, SnO2, ATO, AZO, CZO, IZO, or IGZO is employed as the material of the metal oxide layer 15, the above-mentioned rough surface can be formed.

Subsequently, as the first organic resin layer forming process (S6), a first organic resin layer 16 is formed on the surface of the metal oxide layer 15 using a vapor deposition method. The first organic resin layer 16 is formed to cover the top surface, the side surfaces, and the bottom surface of the first stacked body including the substrate 11, the metal reflection layer 12, the dielectric layer 13, the protective layer 14, and the metal oxide layer 15. Such deposition can be realized by bringing up and fixing the substrate 11 from the substrate holder (for example, U.S. Pat. No. 6,777,690).

Subsequently, as the fluorescent layer forming process (S7), a fluorescent layer 17 is formed on the surface of the first organic resin layer 16 using a vapor deposition method. Then, as the second organic resin layer forming process (S8), a second organic resin layer 18 covering the substrate 11, the metal reflection layer 12, the dielectric layer 13, the protective layer 14, the metal oxide layer 15, the first organic resin layer 16, and the fluorescent layer 17 is formed using a vapor deposition method. The same method as in the first organic resin layer forming process (S6) can be employed as the deposition method. In this way, production of the radiation image conversion panel 10 is completed.

The method for producing the radiation image sensor 1 further includes a light detecting unit disposing process (S19: a light detecting unit disposing step) in addition to Steps S1 to S8 of the method for producing the radiation image conversion panel 10 as illustrated in FIG. 6.

Subsequently to Steps S1 to S8, an adhesive is applied to the top surface 10a (the front surface of the second organic resin layer 18) on the light output surface side of the radiation image conversion panel 10, and the radiation image conversion panel 10 is bonded to the imaging surface 40a side of the light detecting unit 40. In this way, production of the radiation image sensor 1 is completed and the radiation image sensor 1 illustrated in FIG. 2 is obtained.

With the method for producing the radiation image conversion panel 10 and the radiation image sensor 1 according to this embodiment, it is possible to produce a radiation image conversion panel 10 and a radiation image sensor 1 in which adhesion between the metal oxide layer 15 and the first organic resin layer 16 formed on the surface thereof is improved.

Second Embodiment

A radiation image sensor 1A according to a second embodiment is different from the radiation image sensor 1 described in the first embodiment, in that a reduction optical system is additionally provided and the light detecting unit 40 is disposed in a state in which the light detecting unit 40 is detached from the top surface of the light output surface side of the radiation image conversion panel 10. In the second embodiment, the difference from the first embodiment will be mainly described, and repeated description will be omitted.

Figure 7:
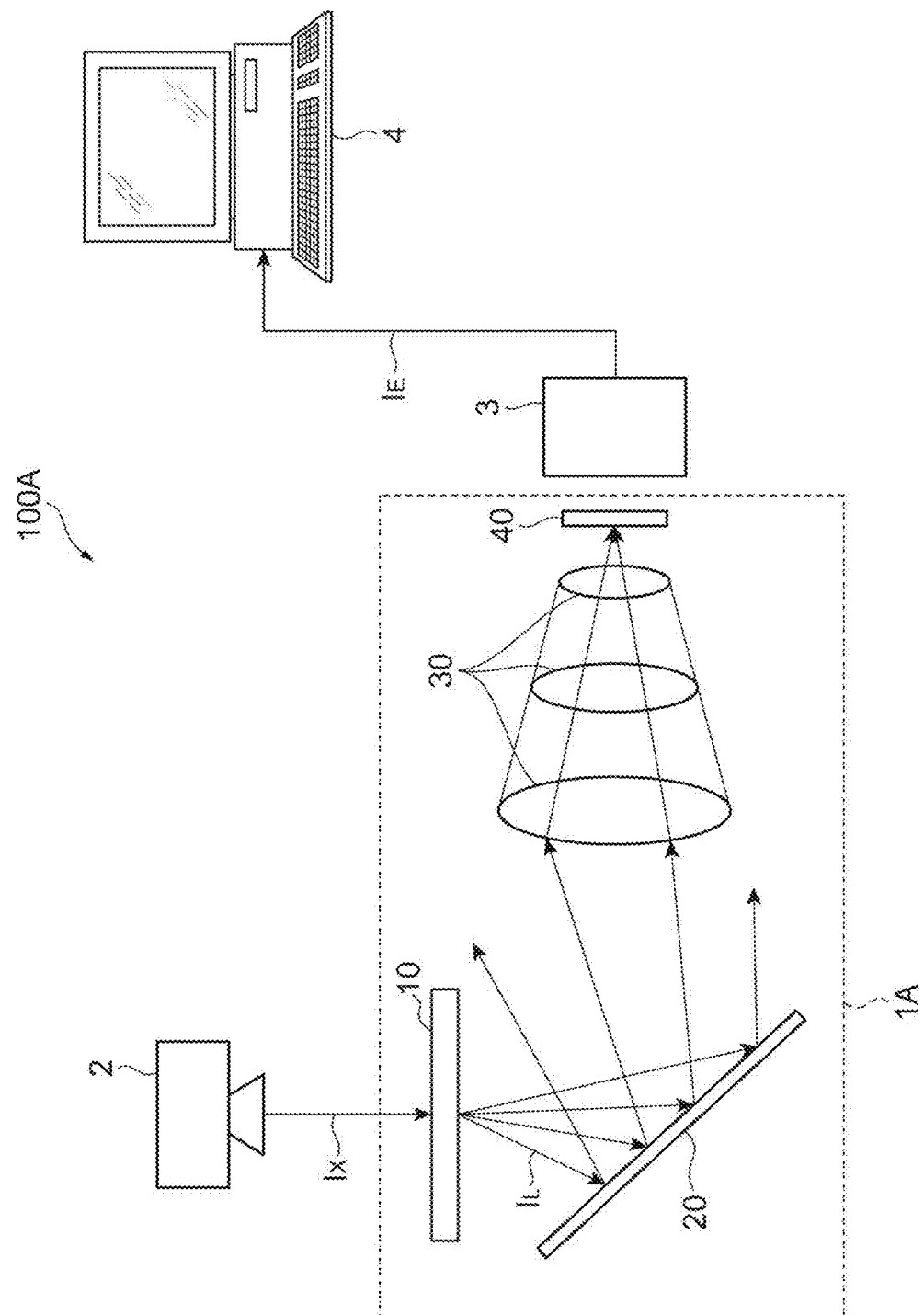
FIG. 7 is a diagram illustrating an entire configuration of a radiation image system including a radiation image conversion panel according to a second embodiment.

FIG. 7 is a diagram illustrating the entire configuration of a radiation image system 100A including a radiation image conversion panel 10 according to the second embodiment. As illustrated in FIG. 7, the radiation image sensor 1A according to this embodiment includes a radiation image conversion panel 10, a mirror 20, a lens 30, and a light detecting unit 40. The radiation image conversion panel 10 is a plate-shaped member and outputs light $I_L$ corresponding to incident radiation $I_X$.

In the radiation image sensor 1A according to this embodiment, the mirror 20, the lens 30, and the light detecting unit 40 are sequentially arranged on an output side of light $I_L$ of the radiation image conversion panel 10. The mirror 20 and the lens 30 serve as a reduction optical system that reduces the light $I_L$ and guides the light to the light detecting unit 40. The reduction optical system is not limited to the illustrated configuration. For example, the reduction optical system may include only the mirror 20 or the lens 30. The number of mirrors 20 and the number of lenses 30 may be one or two or more. A prism or another optical component may be used in addition to the mirror 20 and the lens 30. In this embodiment, a small-sized light detecting unit 40 can be implemented using the reduction optical system.

The light detecting unit 40 detects light emitted from the fluorescent layer 17 (see FIG. 3) of the radiation image conversion panel 10. The light detecting unit 40 includes an imaging surface on which light $I_L$ reduced by the mirror 20 and the lens 30 is incident. The light detecting unit 40 outputs an electrical signal $I_E$ depending on the light $I_L$ incident on the imaging surface.

In the radiation image system 100A according to this embodiment, a radiation image is acquired as follows. First, radiation $I_X$ output from the radiation source 2 is transmitted by a subject and is incident on the radiation image conversion panel 10. The radiation $I_X$ is converted into light $I_L$ by the radiation image conversion panel 10. The light $I_L$ is reduced by the mirror 20 and the lens 30 and is guided to the imaging surface of the light detecting unit 40. An electrical signal $I_E$ corresponding to the light $I_L$ is output from the light detecting unit 40. The output electrical signal $I_E$ is sent to the information processing device 4 via the electronic device 3 and is subjected to a predetermined process, and a radiation image is acquired. In the information processing device 4, the radiation image is displayed on the display unit or image information is stored in the storage unit.

A method for producing the radiation image conversion panel 10 according to this embodiment includes the same steps S1 to S8 as in the first embodiment as illustrated in FIG. 6. A method for producing the radiation image sensor 1A according to this embodiment additionally includes a step of disposing the mirror 20 and a step of disposing the lens 30 after Step S8 in addition to the same steps S1 to S9 as in the first embodiment as illustrated in FIG. 6.

With the radiation image sensor 1A according to this embodiment, similarly to the radiation image sensor 1 described in the first embodiment, it is possible to enhance adhesion between the metal oxide layer 15 and the first organic resin layer 16 formed on the surface thereof.

While embodiments of the present disclosure have been described above, the present disclosure is not limited to the above-mentioned embodiments.

For example, the substrate 11, the metal reflection layer 12, the dielectric layer 13, the protective layer 14, the metal oxide layer 15, the first organic resin layer 16, and the fluorescent layer 17 are sequentially stacked in the first embodiment, but the metal oxide layer 15 may be stacked on the surface of the substrate 11 and the first organic resin layer 16 may be stacked on the surface of the metal oxide layer 15.

Radiation is incident from the rear surface 11b side of the substrate 11 in the first embodiment, but incidence of radiation may be performed from the front surface 11a of the substrate 11.

The dielectric layer 13 is a multilayer structure in which the first dielectric layer 131 and the second dielectric layer 132 are alternately stacked at least one by one in the first embodiment, but only one of the first dielectric layer 131 and the second dielectric layer 132 may be formed.

REFERENCE SIGNS LIST 1, 1A . . . radiation image sensor, 2 . . . radiation source, 3 . . . electronic device, 4 . . . information processing device, 10 . . . radiation image conversion panel, 11 . . . substrate, 12 . . . metal reflection layer, 13 . . . dielectric layer, 14 . . . protective layer, 15 . . . metal oxide layer, 16 . . . first organic resin layer, 17 . . . fluorescent layer, 18 . . . second organic resin layer, 20 . . . mirror, 30 . . . lens, 40 . . . light detecting unit, 40a . . . imaging surface, 100 . . . radiation image system

The invention claimed is:

1. A radiation image conversion panel comprising:
a substrate;
a metal oxide layer formed on the substrate, including conductivity, and including a rough surface;
a first organic resin layer formed on the surface of the metal oxide layer; and
a fluorescent layer formed on the first organic resin layer, including a plurality of columnar crystals, and configured to emit light in accordance with incident radiation.

2. The radiation image conversion panel according to claim 1, further comprising a metal reflection layer formed between the substrate and the metal oxide layer,
wherein the metal oxide layer is transparent to the light emitted from the fluorescent layer.

3. The radiation image conversion panel according to claim 2, further comprising a dielectric layer formed between the metal reflection layer and the metal oxide layer.

4. The radiation image conversion panel according to claim 3, further comprising a second organic resin layer covering the substrate, the metal reflection layer, the dielectric layer, the metal oxide layer, the first organic resin layer, and the fluorescent layer.

5. The radiation image conversion panel according to claim 1, wherein a material of the substrate is glass or a resin.

6. The radiation image conversion panel according to claim 1, wherein the metal oxide layer is formed of ITO, FTO, $SnO_2$, ATO, AZO, GZO, IZO, or IGZO.

7. The radiation image conversion panel according to claim 1, wherein the metal oxide layer is formed of ITO and the surface thereof has a crystal-grain area structure including crystal grains and crystallites, a polycrystalline structure including crystal grains, or a porous structure.

8. A radiation image sensor comprising:
   the radiation image conversion panel according to claim 1; and
   a light detecting unit disposed to face the fluorescent layer and configured to detect the light emitted from the fluorescent layer.

9. A method for producing a radiation image sensor, comprising:
   a light detecting unit disposing step of disposing a light detecting unit, which detects the light emitted from the fluorescent layer of the radiation image conversion panel, on the fluorescent layer side of the radiation image conversion panel according to claim 1.

10. A method for producing a radiation image conversion panel, comprising:
    a metal oxide layer forming step of forming a metal oxide layer on a substrate using a sputtering method, an evaporation method, or a dip-coating method;
    a first organic resin layer forming step of forming a first organic resin layer on a surface of the metal oxide layer using a vapor deposition method; and
    a fluorescent layer forming step of forming a fluorescent layer on the first organic resin layer using a vapor deposition method.

11. The method for producing a radiation image conversion panel according to claim 10, further comprising a metal reflection layer forming step of forming a metal reflection layer on the substrate using a vapor deposition method before the metal oxide layer forming step,
    wherein the metal oxide layer forming step is a step of forming the metal oxide layer on the metal reflection layer on the substrate.

12. The method for producing a radiation image conversion panel according to claim 11, further comprising a dielectric layer forming step of forming a dielectric layer on the metal reflection layer using a vapor deposition method after the metal reflection layer forming step,
    wherein the metal oxide layer forming step is a step of forming the metal oxide layer on the dielectric layer on the substrate.

13. The method for producing a radiation image conversion panel according to claim 12, further comprising a second organic resin layer forming step of forming a second organic resin layer to cover the substrate, the metal reflection layer, the dielectric layer, the metal oxide layer, the first organic resin layer, and the fluorescent layer using a vapor deposition method.

* * * * *